(12) United States Patent
Ha et al.

(10) Patent No.: US 12,211,168 B2
(45) Date of Patent: Jan. 28, 2025

(54) GENERATING A REPRESENTATION OF A SPHERICAL IMAGE

(71) Applicant: AlcaCruz Inc., San Mateo, CA (US)

(72) Inventors: SangYoo Ha, San Mateo, CA (US); Seoyoung Kang, San Carlos, CA (US)

(73) Assignee: AlcaCruz Inc., Belmont, CA (US)

( * ) Notice: Subject to any disclaimer, the term of this patent is extended or adjusted under 35 U.S.C. 154(b) by 82 days.

(21) Appl. No.: 17/912,132

(22) PCT Filed: Mar. 25, 2020

(86) PCT No.: PCT/US2020/024685
§ 371 (c)(1),
(2) Date: Sep. 16, 2022

(87) PCT Pub. No.: WO2021/194483
PCT Pub. Date: Sep. 30, 2021

(65) Prior Publication Data
US 2023/0140759 A1    May 4, 2023

(51) Int. Cl.
*G06T 3/12* (2024.01)
*G06T 3/4038* (2024.01)

(52) U.S. Cl.
CPC ............. *G06T 3/12* (2024.01); *G06T 3/4038* (2013.01)

(58) Field of Classification Search
CPC .. G06T 3/12; G06T 17/10; G06T 3/04; G06T 3/047; G06T 3/073; G06T 17/30; G06T 3/4038
See application file for complete search history.

(56) References Cited

U.S. PATENT DOCUMENTS

2006/0256113 A1    11/2006  Grover et al.
2017/0244775 A1    8/2017   Ha et al.
(Continued)

FOREIGN PATENT DOCUMENTS

EP    1779660 B1    10/2013
EP    3606085 A1    2/2020
(Continued)

OTHER PUBLICATIONS

"International Application Serial No. PCT/US2020/024685, International Search Report mailed Dec. 23, 2020", 4 pgs.
(Continued)

*Primary Examiner* — Hau H Nguyen
(74) *Attorney, Agent, or Firm* — Schwegman, Lundberg & Woessner, P.A.

(57) ABSTRACT

A machine is configured to generate a representation of a rectangular image, which may depict a projection of a spherical image. The machine generates a first triangular array of pixels based on an upper rectangular region of the rectangular image. The machine generates a second triangular array of pixels based on a lower rectangular region of the rectangular image, and the machine generates a rectangular array of pixels based on a middle rectangular region of the rectangular image. The machine then generates an output image that includes the first triangular array of pixels, the second triangular array of pixels, and the rectangular array of pixels. After the output image is generated, the machine may provide the generated output image for use as a representation of rearranged image data of the spherical image.

20 Claims, 9 Drawing Sheets

(56) References Cited

U.S. PATENT DOCUMENTS

2018/0152690 A1* 5/2018 Ha .................. H04N 13/161
2018/0158170 A1* 6/2018 Lin .................. G06T 1/0007
2020/0211258 A1* 7/2020 Lin .................. G06T 3/06

FOREIGN PATENT DOCUMENTS

KR  20190130556 A  11/2019
WO  WO-2021194483 A1  9/2021

OTHER PUBLICATIONS

"International Application Serial No. PCT/US2020/024685, Written Opinion mailed Dec. 23, 2020", 4 pgs.

"International Application Serial No. PCT US2020 024685, International Preliminary Report on Patentability mailed Oct. 6, 2022", 6 pgs.

* cited by examiner

GENERATING A REPRESENTATION OF A SPHERICAL IMAGE

This application is a U.S. National Stage Application, under 35 U.S.C. § 371, of International Application No. PCT/US2020/024685, which was filed on Mar. 25, 2020 and published as International Publication No. WO 2021/194483 on Sep. 30, 2021, and which is incorporated herein by reference in its entirety.

TECHNICAL FIELD

The subject matter disclosed herein generally relates to the technical field of special-purpose machines that facilitate image processing, including software-configured computerized variants of such special-purpose machines and improvements to such variants, and to the technologies by which such special-purpose machines become improved compared to other special-purpose machines that facilitate image processing. Specifically, the present disclosure addresses systems and methods to facilitate generating a representation of a spherical image.

BACKGROUND

A machine may be configured to access and process a spherical image or spherical image data thereof. Such a spherical image may be a spherical video frame taken from a sequence of spherical video frames that collectively form all or part of a spherical video. For example, such a spherical video may depict visual content spanning a spherical field of view (e.g., a horizontal range of 360 degrees azimuth and a vertical range from −90 degrees elevation to +90 degrees elevation).

BRIEF DESCRIPTION OF THE DRAWINGS

Some embodiments are illustrated by way of example and not limitation in the figures of the accompanying drawings.

DETAILED DESCRIPTION

Example methods (e.g., algorithms) facilitate use of an image data layout for representing one or more spherical images to generate a representation of a spherical image, and example systems (e.g., special-purpose machines configured by special-purpose software) are configured to facilitate use of the image data layout for representing one or more spherical images to generate a representation of a spherical image. For example, generating a representation of a spherical image may include generating an output image from a rectangular image that represents the spherical image. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a server computer system, a mobile device, or some other computing machine) is configured (e.g., by suitable hardware, software, or both) to perform image processing to generate a representation of a spherical image according to any one or more of the methodologies discussed herein. As accordingly configured, the machine accesses a rectangular (e.g., equirectangular) image that depicts a projection (e.g., an equirectangular projection or other cylindrical projection) of a spherical image. The rectangular image includes an upper rectangular region that corresponds to an upper polar region of the spherical image. The rectangular image includes a middle rectangular region that corresponds to an equatorial region of the spherical image, and the rectangular image includes a lower rectangular region that corresponds to a lower polar region of the spherical image.

The machine generates a first triangular array of pixels based on the upper rectangular region of the rectangular image. The machine generates a second triangular array of pixels based on the lower rectangular region of the rectangular image, and the machine generates a rectangular array of pixels based on the middle rectangular region of the rectangular image. The machine then generates an output image (e.g., as a representation of the spherical image), and the output image includes the first triangular array of pixels, the second triangular array of pixels, and the rectangular array of pixels. After the output image is generated, the machine may provide the generated output image for use as a representation of rearranged image data of the spherical image (e.g., as the representation of the spherical image).

Figure 1:
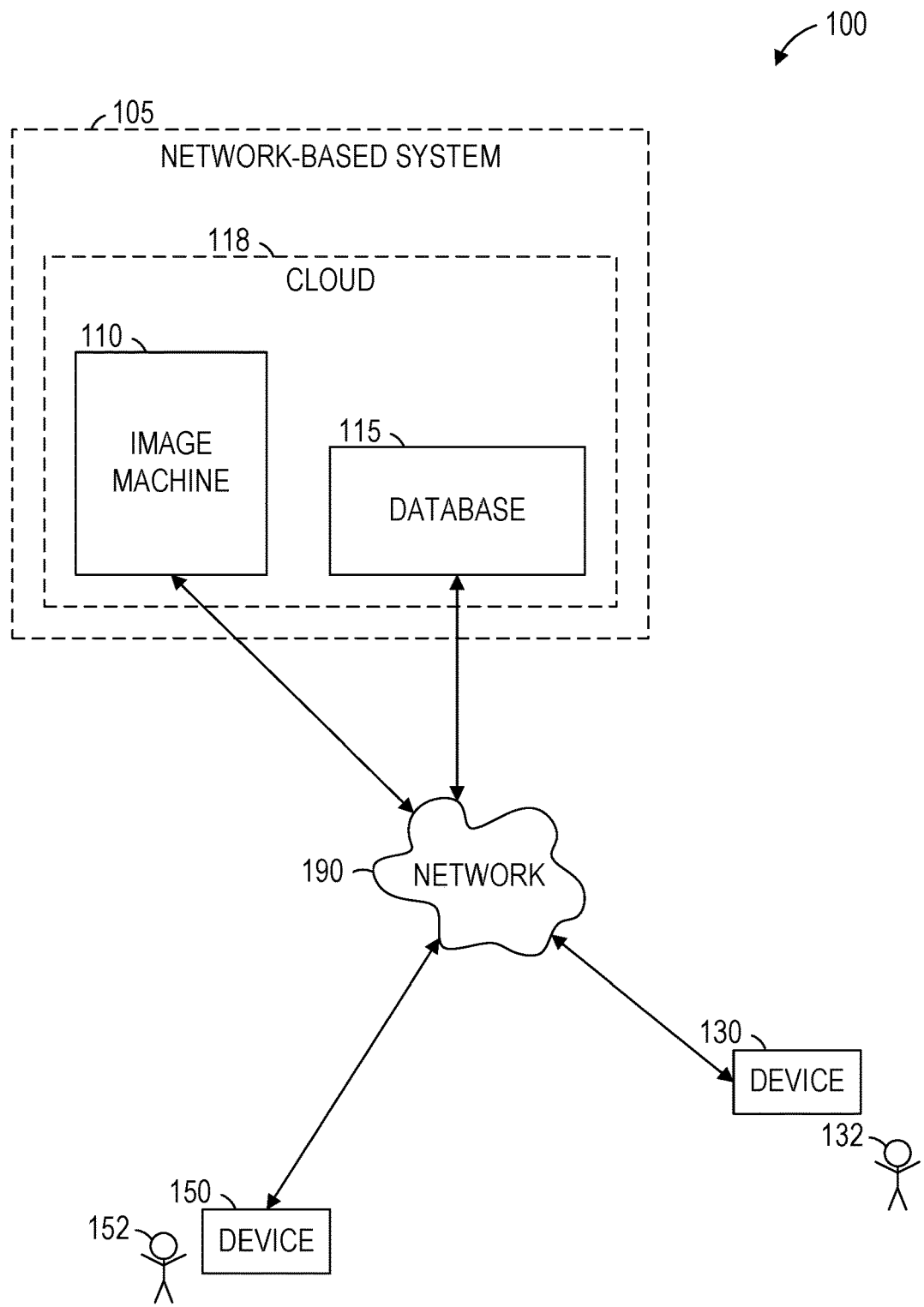
FIG. 1 is a network diagram illustrating a network environment suitable for generating a representation of a spherical image, according to some example embodiments.

FIG. 1 is a network diagram illustrating a network environment 100 suitable for generating a representation of a spherical image, according to some example embodiments. The network environment 100 includes an image machine 110 (e.g., an image processing server machine), a database 115, and devices 130 and 150 (e.g., image processing mobile devices), all communicatively coupled to each other via a network 190. The image machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The image machine 110 and the devices 130 and 150 may each be implemented in a special-purpose (e.g., specialized) computer system, in whole or in part, as described below with respect to FIG. 9.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 9, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
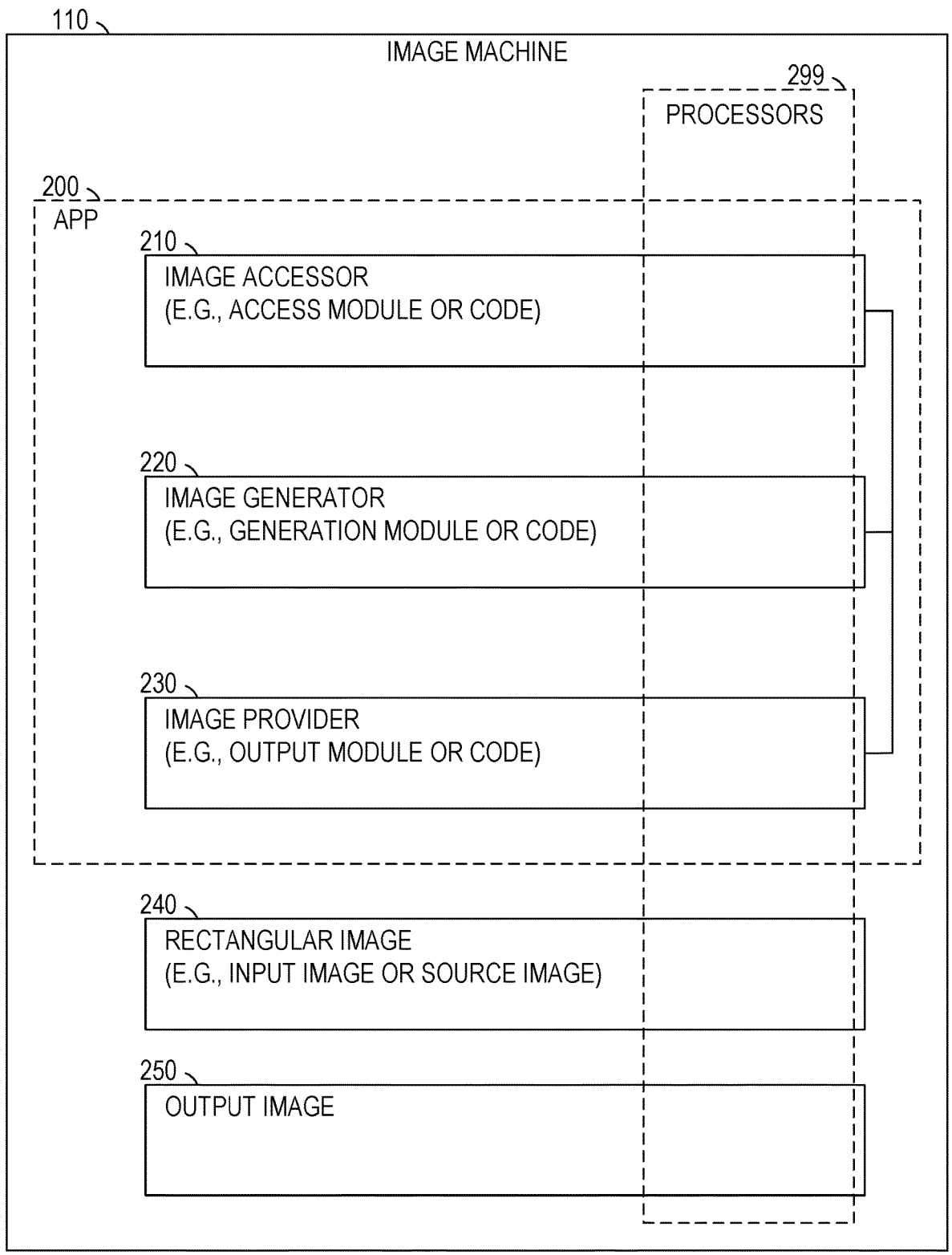
FIG. 2 is a block diagram illustrating components of an image machine configured to generate a representation of a spherical image, according to some example embodiments.

FIG. 2 is a block diagram illustrating components of the image machine 110 configured to use one or more variants of the image data layout discussed herein in generating a representation of a spherical image, according to some example embodiments. The image machine 110 is shown as including an image accessor 210, an image generator 220, and an image provider 230, all configured to communicate with each other (e.g., via a bus, shared memory, or a switch). The image machine 110 may store a rectangular image 240 (e.g., an equirectangular image), which may provide source data for one or more of the methodologies discussed herein. The image machine 110 may store an output image 250, which may result from processing the rectangular image 240 using one or more of the methodologies discussed herein.

As shown in FIG. 2, the image accessor 210, the image generator 220, the image provider 230, or any suitable combination thereof, may form all or part of an app 200 (e.g., a server app) that is stored (e.g., installed) on the image machine 110 (e.g., responsive to or otherwise as a result of data being received by the image machine 110 via the network 190). Furthermore, one or more processors 299 (e.g., hardware processors, digital processors, or any suitable combination thereof) may be included (e.g., temporarily or permanently) in the app 200, the image accessor 210, the image generator 220, the image provider 230, or any suitable combination thereof.

Figure 3:
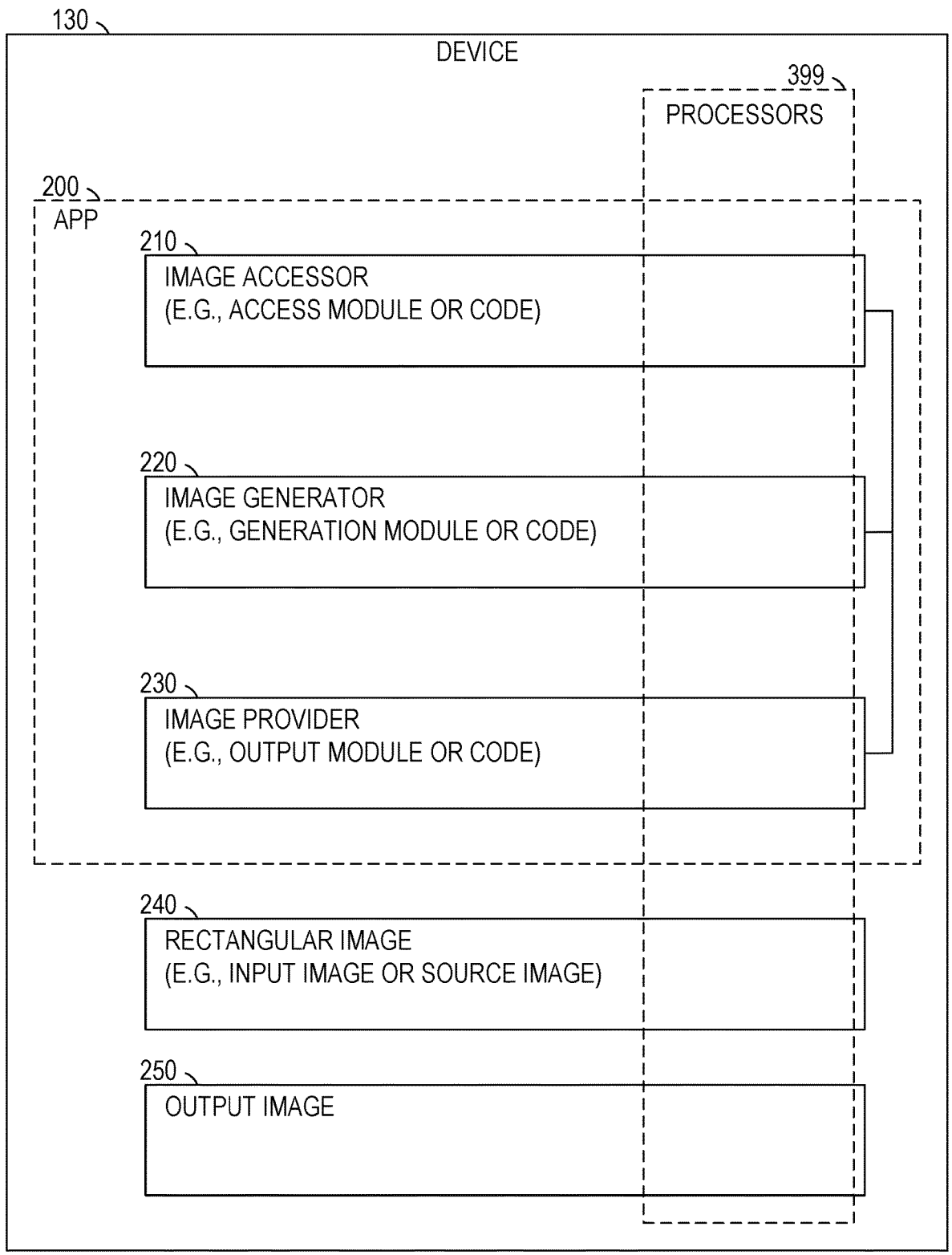
FIG. 3 is a block diagram illustrating components of a device configured to generate a representation of a spherical image, according to some example embodiments.

FIG. 3 is a block diagram illustrating components of the device 130 configured to use one or more variants of the image data layout discussed herein to generate a representation of a spherical image, according to some example embodiments. The device 130 is shown as including an instance of the image accessor 210, an instance of the image generator 220, and an instance of the image provider 230, all configured to communicate with each other (e.g., via a bus, shared memory, or a switch). The device 130 may store the rectangular image 240, the output image 250, or both.

As shown in FIG. 3, the instances of the image accessor 210, the image generator 220, the image provider 230, or any suitable combination thereof, may form all or part of an instance of the app 200 (e.g., a mobile app), which may be stored (e.g., installed) on the device 130 (e.g., responsive to or otherwise as a result of data being received by the device 130 via the network 190). Furthermore, one or more processors 399 (e.g., hardware processors, digital processors, or any suitable combination thereof) may be included (e.g., temporarily or permanently) in instances of the app 200, the image accessor 210, the image generator 220, the image provider 230, or any suitable combination thereof.

Any one or more of the components (e.g., modules) described herein may be implemented using hardware alone (e.g., one or more of the processors 299 or 399) or a combination of hardware and software. For example, any component described herein may physically include an arrangement of one or more of the processors 299 or 399 (e.g., a subset of or among the processors 299 or 399) configured to perform the operations described herein for that component. As another example, any component described herein may include software, hardware, or both, that configure an arrangement of one or more of the processors 299 or 399 to perform the operations described herein for that component. Accordingly, different components described herein may include and configure different arrangements of the processors 299 or 399 at different points in time or a single arrangement of the processors 299 or 399 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
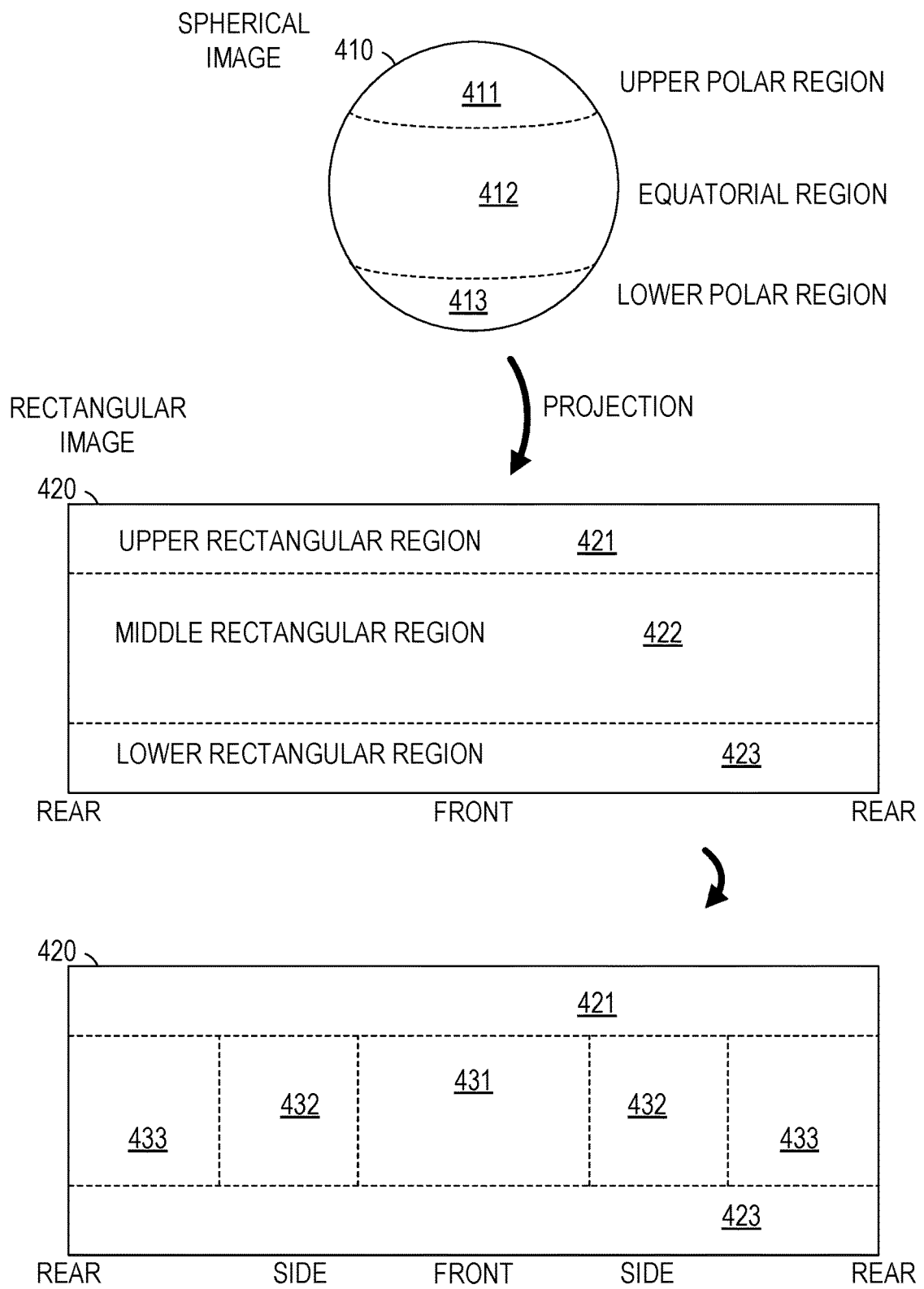
FIGS. 4-6 are block diagrams illustrating image processing of image data from a spherical image to obtain a rectangular image, and then further image processing of the rectangular image to generate a representation of the spherical image, according to some example embodiments.
Figure 5:
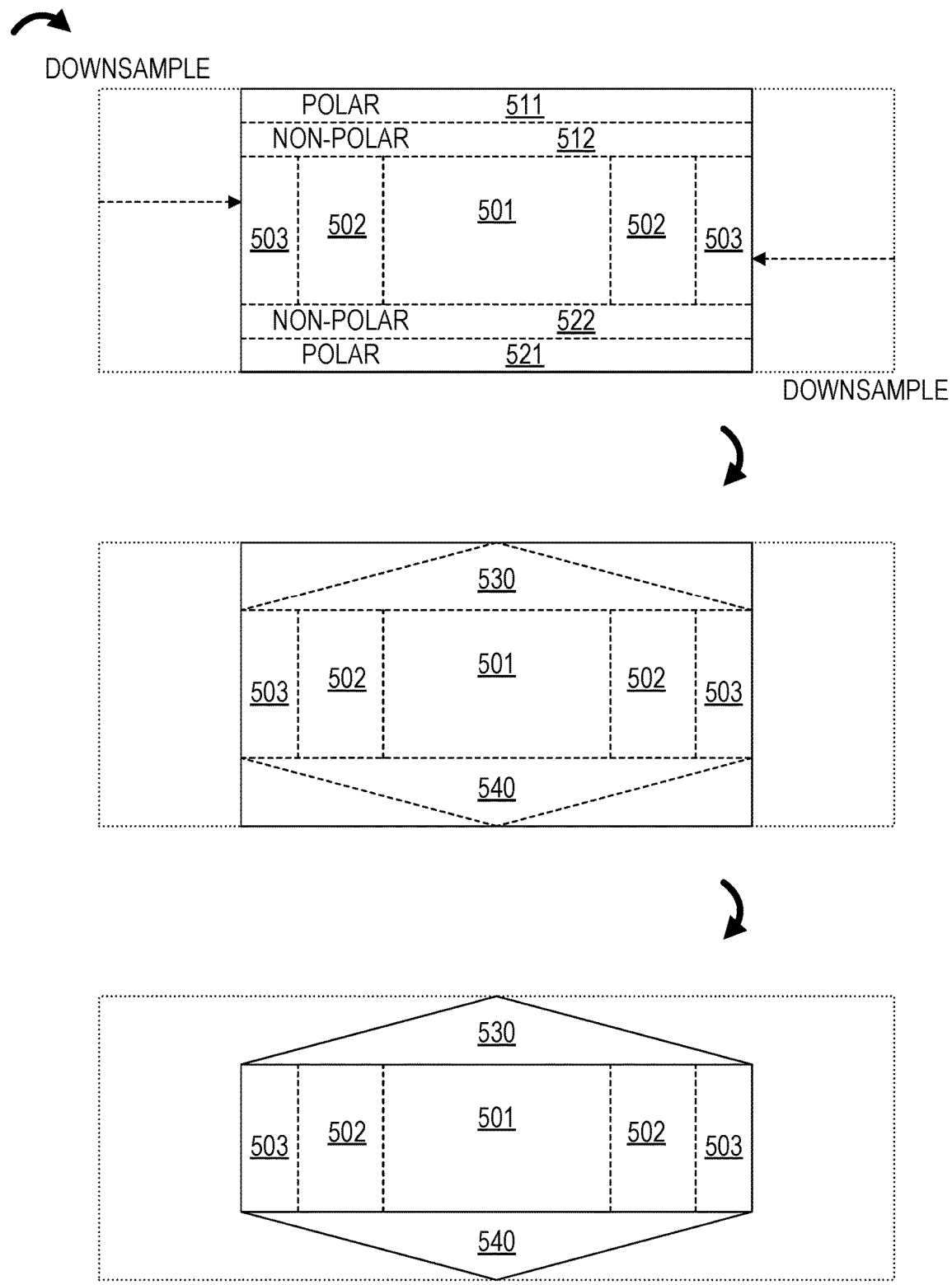
Figure 6:
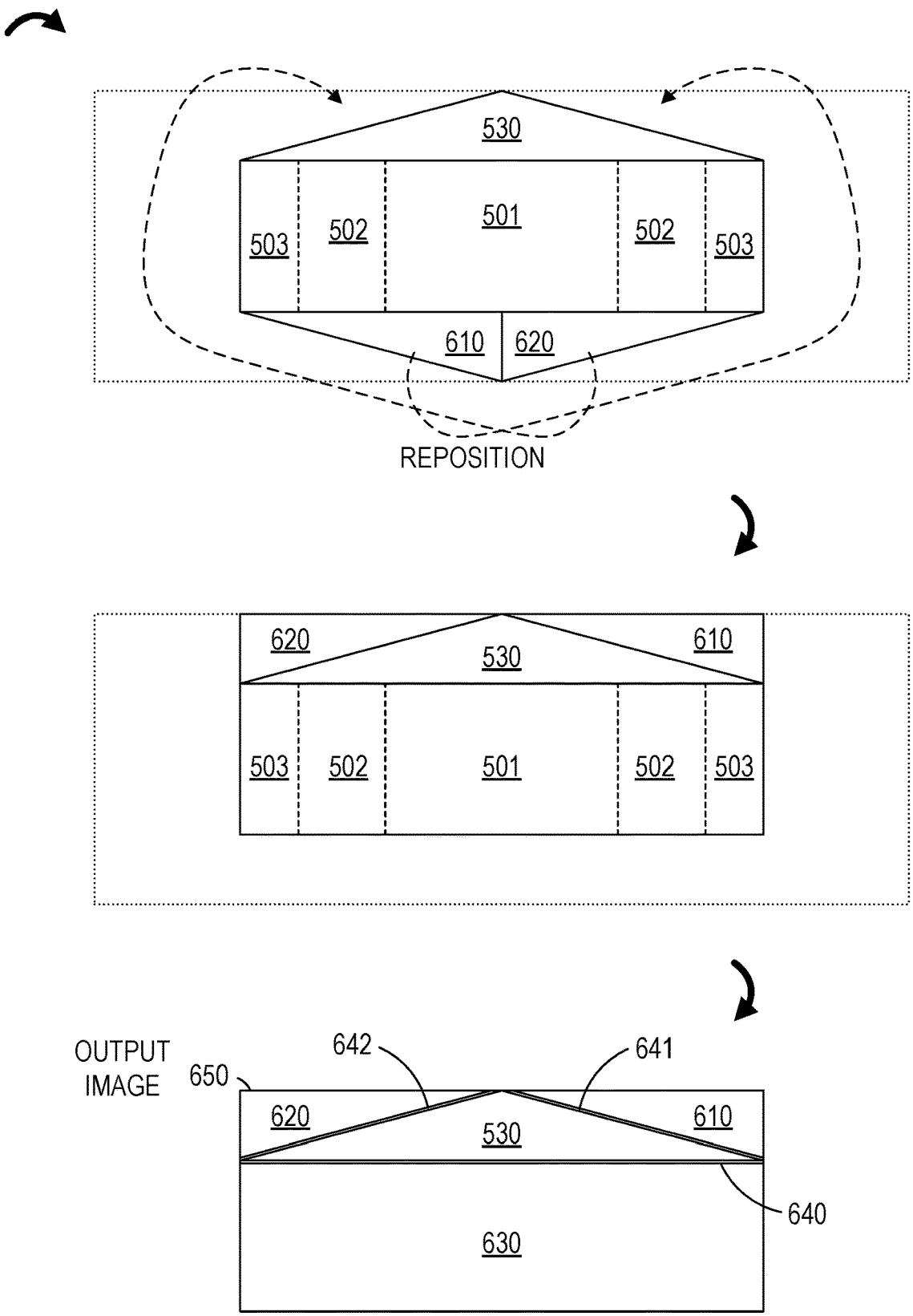

FIGS. 4-6 are block diagrams illustrating processing (e.g., image processing) of image data from a spherical image 410 to obtain a rectangular image 420 (e.g., the rectangular image 240), and then further image processing of the rectangular image 420 to obtain an output image 650 (e.g., the output image 250), according to some example embodiments. The curved arrows indicate transitions between example phases in an example workflow that takes the spherical image 410 as input and ultimately generates the output image 650 as output.

As shown in the upper portion of FIG. 4, the spherical image 410 (e.g., composed of spherical pixels and depicting a field of view that spans 360 degrees horizontally and 180 degrees vertically) includes an upper polar region 411, an equatorial region 412, and a lower polar region 413. For example, the upper polar region 411 may correspond to an upper pole (e.g., a North pole) of the spherical image 410, and the upper polar region 411 may be or include a dome-shaped or inverted bowl-shaped array of spherical pixels (e.g., spanning 360 degrees of azimuth and an elevation range from +90 degrees to a lower boundary elevation, such as +45 degrees). Similarly, the lower polar region 413 may correspond to a lower pole (e.g., a South pole) of the spherical image 410, and the lower polar region 413 may be or include a bowl-shaped or inverted dome-shaped array of spherical pixels (e.g., spanning 360 degrees of azimuth and an elevation range from −90 degrees to an upper boundary elevation, such as −45 degrees).

Accordingly, the equatorial region 412 of the spherical image 410 may correspond to an equator of the spherical image 410, and the equatorial region 412 may be or include a barrel-shaped or bulging cylindrical array of spherical pixels (e.g., spanning 360 degrees of azimuth and an elevation range between the bounds of the upper polar region 411 and the lower polar region 413, such as between 45 degrees elevation and −45 degrees elevation). In accordance with the methodologies discussed herein, the equatorial region 412 is more likely to contain image content of visual interest to one or more users (e.g., the users 132 and 152) than the upper polar region 411 or the lower polar region 413. As indicated by a curved arrow, the spherical image 410 may be projected (e.g., via equirectangular projection or other cylindrical projection) to generate or otherwise obtain the rectangular image 420 (e.g., an equirectangular image or other projected image).

As shown in the middle portion of FIG. 4, the rectangular image 420 includes an upper rectangular region 421, a middle rectangular region 422, and a lower rectangular region 423. For example, the upper rectangular region 421 may correspond to the upper polar region 411 of the spherical image 410, and the upper rectangular region 421 may be or include a projection (e.g., equirectangular or other cylindrical) of the upper polar region 411 of the spherical image 410. Similarly, the lower rectangular region 423 may correspond to the lower polar region 413 of the spherical image 410, and the lower rectangular region 423 may be or include a projection (e.g., equirectangular or other cylindrical) of the lower polar region 413 of the spherical image 410.

Likewise, the middle rectangular region 422 may correspond to the equatorial region 412 of the spherical image 410, and the middle rectangular region 422 may be or include a projection (e.g., equirectangular or other cylindrical) of the equatorial region 412 of the spherical image 410. In accordance with the methodologies discussed herein, the middle rectangular region 422 is more likely to contain image content of visual interest to one or more users (e.g., the users 132 and 152) than the upper rectangular region 421 or the lower rectangular region 423.

The spherical image 410 may have a frontal direction (e.g., an azimuth direction designated as a front or forward direction, such as 0 degrees azimuth), and the rectangular image 420 may accordingly have a corresponding frontal portion. Similarly, the spherical image 410 may have a rearward direction (e.g., an azimuth direction designated as a rear or rearward direction, such as 180 degrees away from the frontal direction or −180 degrees away from the frontal direction).

As shown in the lower portion of FIG. 4, the rectangular image 420 may be treated as being subdivided into the upper rectangular region 421, the middle rectangular region 422, and the lower rectangular region 423. Contemporaneously, the middle rectangular region 422 may be treated as being subdivided into a frontal sub-region 431, multiple (e.g., two) peripheral sub-regions 432, and multiple (e.g., two) rearward sub-regions 433. In some example embodiments, one or both of the upper rectangular region 421 and the lower rectangular region 423 are similarly treated as being subdivided like the middle rectangular region 422.

The frontal sub-region 431 may contain or otherwise represent image data that corresponds to the frontal direction of the spherical image 410. The peripheral sub-regions 432 may contain or otherwise represent image data that corresponds to side directions (e.g., perpendicular to the frontal direction) of the spherical image 410. The rearward sub-regions 433 may contain or otherwise represent image data that corresponds to the rearward direction (e.g., opposing the frontal direction) of the spherical image 410. In accordance with the methodologies discussed herein, the frontal sub-region 431 is more likely to contain image content of visual interest to one or more users (e.g., the users 132 and 152) than the peripheral sub-regions 432, and the peripheral sub-regions 432 are more likely to contain image content of visual interest to the one or more users than the rearward sub-regions 433.

As shown in the upper portion of FIG. 5, one or more downsampling operations may be performed to reduce the ultimately generated output image 650 in terms of total pixels, image resolution (e.g., expressed in horizontal pixel width times vertical pixel height), data size (e.g., expressed in bits or bytes), or any suitable combination thereof. Such downsampling may be performed by selecting a representative sample of the pixels in a given region or sub-region. The upper portion of FIG. 5 shows that the frontal sub-region 431 may be downsampled (e.g., a minimal amount or other smallest amount compared to the peripheral and rearward sub-regions 432 and 433) to become a frontal sub-region 501 that is smaller (e.g., slightly) than the frontal sub-region 431. In some example embodiments, the frontal sub-region 431 becomes the frontal sub-region 501 without any downsampling (e.g., to preserve high image resolution, high pixel density, or other measure of image quality locally therein).

In contrast, as shown in the upper portion of FIG. 5, the peripheral sub-regions 432 may be downsampled (e.g., a moderate amount or other amount greater than that for the frontal sub-region 431) to become peripheral sub-regions 502 that are smaller than the peripheral sub-regions 432. The peripheral sub-regions 432 may thus be sampled less than the frontal sub-region 431 (e.g., to reduce image resolution, pixel density, or other measure of image quality locally therein).

Similarly, but to an even greater extent, as shown in the upper portion of FIG. 5, the rearward sub-regions 433 may be downsampled (e.g., a large amount or other amount greater than that for the peripheral sub-regions 432) to become rearward sub-regions 503 that are smaller than the rearward sub-regions 433. The rearward sub-regions 4333 may thus be sampled even less than the peripheral sub-regions 432 (e.g., to reduce image resolution, pixel density, or other measure of image quality locally therein).

As additionally shown in the upper portion of FIG. 5, the upper rectangular region 421 of the rectangular image 420 may be downsampled to become a smaller rectangular region that itself may be subdivided into a polar sub-region 511 and a non-polar sub-region 512 (e.g., for differentiated treatment in later processing). In accordance with the methodologies discussed herein, the non-polar sub-region 512 is more likely to contain image content of visual interest to one or more users (e.g., the users 132 and 152) than the polar sub-region 511.

Likewise, the lower rectangular region 423 of the rectangular image 420 may be downsampled to become a small rectangular region that itself may be subdivided into a polar sub-region 521 and a non-polar sub-region 522 (e.g., for differentiated treatment in later processing). In accordance with the methodologies discussed herein, the non-polar sub-region 522 is more likely to contain image content of visual interest to one or more users (e.g., the users 132 and 152) than the polar sub-region 521.

As shown in the middle and lower portions of FIG. 5, a triangular array 530 of pixels may be generated based on the upper rectangular region 421 of the rectangular image 420 (e.g., with or without downsampling). Due to the fact that the rectangular image 420 is a projection (e.g., an equirectangular projection) of the spherical image 410, the uppermost horizontal lines of pixels in the upper rectangular region 421 represent a relatively small number of spherical pixels, while the lowermost horizontal lines of pixels in the upper rectangular region 421 represents a relatively large number of spherical pixels. Accordingly, the triangular array 530 may be generated to represent the various horizontal lines of pixels in the upper rectangular region 421, based on their underlying numbers of represented spherical pixels in the upper polar region 411 of the spherical image 410. For example, the triangular array 530 (e.g., a first triangular array or an upper triangular array) may be an isosceles triangular array and may have an isosceles triangular shape (e.g., as illustrated in FIG. 5). In accordance with the methodologies discussed herein, the triangular array 530 of pixels is more likely to contain image content of visual interest to one or more users (e.g., the users 132 and 152) than the remainder (e.g., the upper corners) of the upper rectangular region 421 (e.g., with or without downsampling).

Furthermore, the triangular array 530 may be generated by downsampling the polar sub-region 511 more (e.g., to a greater extent) than the non-polar sub-region 512. In other words, the triangular array 530 may be created by downsampling the polar sub-region 511 to a first extent, downsampling the non-polar sub-region 512 to a second extent that is greater than the first extent, and then combining the resulting pixels into a triangle-shaped layout (e.g., shaped like an isosceles triangle), as depicted in the lower portion of FIG. 5.

As also shown in the middle and lower portions of FIG. 5, a triangular array 540 of pixels may be generated based on the lower rectangular region 423 of the rectangular image 420 (e.g., with or without downsampling). Again, due to the fact that the rectangular image 420 is a projection (e.g., an equirectangular projection) of the spherical image 410, the lowermost horizontal lines of pixels in the lower rectangular region 423 represent a relatively small number of spherical pixels, while the uppermost horizontal lines of pixels in the lower rectangular region 423 represents a relatively large number of spherical pixels. Accordingly, the triangular array 540 may be generated to represent the various horizontal lines of pixels in the lower rectangular region 423, based on their underlying numbers of represented spherical pixels in the lower polar region 413 of the spherical image 410. For example, the triangular array 540 (e.g., a second triangular array or a lower triangular array) may be an isosceles triangular array and may have an isosceles triangular shape (e.g., as illustrated in FIG. 5). In accordance with the methodologies discussed herein, the triangular array 540 of pixels is more likely to contain image content of visual interest to one or more users (e.g., the users 132 and 152) than the remainder (e.g., the lower corners) of the lower rectangular region 423 (e.g., with or without downsampling).

Furthermore, the triangular array 540 may be generated by downsampling the polar sub-region 521 more (e.g., to a greater extent) than the non-polar sub-region 522. In other words, the triangular array 540 may be created by downsampling the polar sub-region 521 to a first extent, downsampling the non-polar sub-region 522 to a second extent that is greater than the first extent, and then combining the resulting pixels into a triangle-shaped layout (e.g., shaped like an isosceles triangle), as depicted in the lower portion of FIG. 5.

As shown in the lower portion of FIG. 5, the frontal sub-region 501, the peripheral sub-regions 502, and the rearward sub-regions 503 collectively form a rectangular array of pixels. This rectangular array of pixels may be adjacent to the triangular array 530 and the triangular array 540 (e.g., capped above by the triangular array 530 and capped below by the triangular array 540).

As shown in the upper portion of FIG. 6, one of the two triangular arrays 530 and 540 may be subdivided into multiple (e.g., two) right triangular areas for repositioning to form a rectangular area with the other triangular array. The illustrated example shows the triangular array 540 being subdivided into two right triangular arrays 610 and 620. As indicated by dashed arrows, each of these right triangular arrays 610 and 620 may then be repositioned respectively to a diagonally opposing corner of the rectangular array formed by the frontal sub-region 501, the peripheral sub-regions 502, and the rearward sub-regions 503.

In the example shown, the lengths of the hypotenuses of the right triangular arrays 610 and 620 match the lengths of the sides of the undivided triangular array 530. As a result, the repositioned right triangular arrays 610 and 620 can be moved adjacent to the sides of the triangular array 530 to form a rectangular area.

Accordingly, as shown in the middle portion of FIG. 6, the repositioned right triangular array 610 has been moved from its original location under the left side of the rectangular array formed by the frontal sub-region 501, the peripheral sub-regions 502, and the rearward sub-regions 503, to a new location above the right side of that rectangular array. Similarly, the repositioned right triangular array 620 has been moved from its original location under the right side of the rectangular array to a new location above the left side of the rectangular array. Thus, the repositioned right triangular arrays 610 and 620 of pixels combine with the triangular array 530 of pixels to form a rectangular area that has the same horizontal dimension (e.g., width) as the rectangular array formed by the frontal sub-region 501, the peripheral sub-regions 502, and the rearward sub-regions 503. The lower portion of FIG. 6 depicts a rectangular array 630 of pixels being formed by the frontal sub-region 501, the peripheral sub-regions 502, and the rearward sub-regions 503 depicted in the middle portion of FIG. 6.

As shown in the lower portion of FIG. 6, the rectangular array 630 (e.g., containing or otherwise including the frontal sub-region 501, the peripheral sub-regions 502, and the rearward sub-regions 503) may be adjacent to the triangular array 530 of pixels or may be separated from the triangular array 530 by a horizontal line 640 of padding pixels (e.g., with a line thickness of 1, 2, 3, 4, or 5 padding pixels). Likewise, the triangular array 530 of pixels may be adjacent to the repositioned right triangular array 610 or may be separated from the right triangular array 610 by a diagonal line 641 of padding pixels (e.g., 1, 2, 3, 4, or 5 padding pixels thick). Similarly, the triangular array 530 of pixels may be adjacent to the repositioned right triangular array 620 or may be separated from the right triangular array 620 by a diagonal line 642 of padding pixels (e.g., 1, 2, 3, 4, or 5 padding pixels thick). In each of these horizontal or diagonal lines of padding pixels, the colors of the padding pixels may be selected (e.g., by the image generator 220) to optimize, improve, or otherwise facilitate image compression (e.g., via one or more codecs) by, for example, reducing discontinuities in brightness, hue, saturation, or any suitable combination thereof between adjacent or nearest neighboring pixels on opposite sides of that diagonal line.

The resulting output image 650 (e.g., the output image 250) may accordingly function as a representation (e.g., a representative image) of the spherical image 410, the rectangular image 420, or both. That is, the image data the spherical image 410, which was represented in one manner by the rectangular image 420, is represented in another manner by the output image 650. By virtue of the methodologies discussed herein, the output image 650 is smaller than the rectangular image 420, in terms of total pixels, image resolution, data size, or any suitable combination thereof. Accordingly, the output image 650 may be more suitable than the rectangular image 240 for storage, streaming, or both, in providing a representation of the spherical image 410. Thus, storage and communication of the output image 650 may facilitate higher performance, lower resource consumption, lower latency, more reliable user experiences, and lower operating costs, compared to other approaches to representing the spherical image 410.

Figure 7:
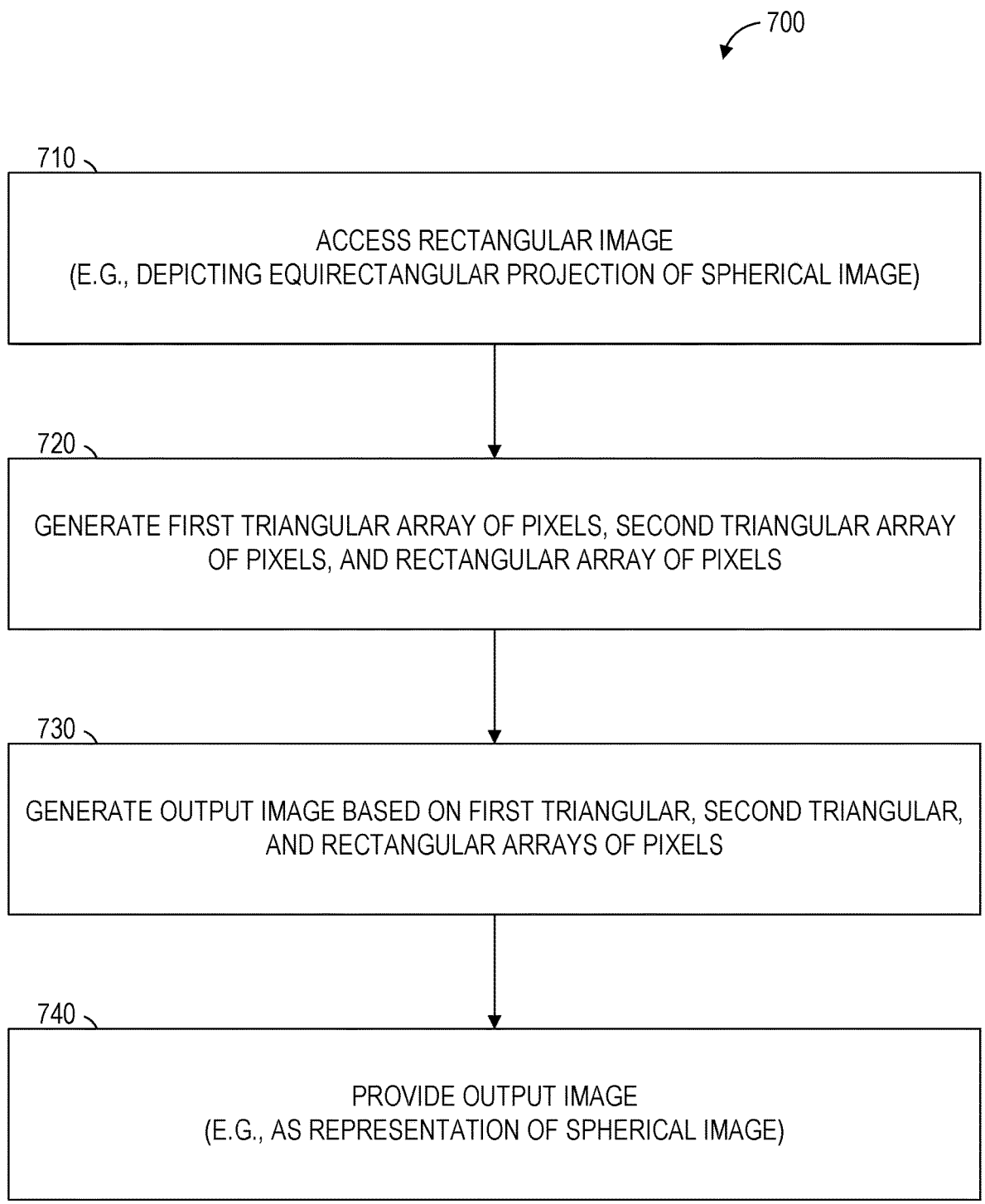
FIGS. 7 and 8 are flowcharts illustrating operations of a machine in performing a method of generating an output image from a rectangular image that represents a spherical image, according to some example embodiments.
Figure 8:
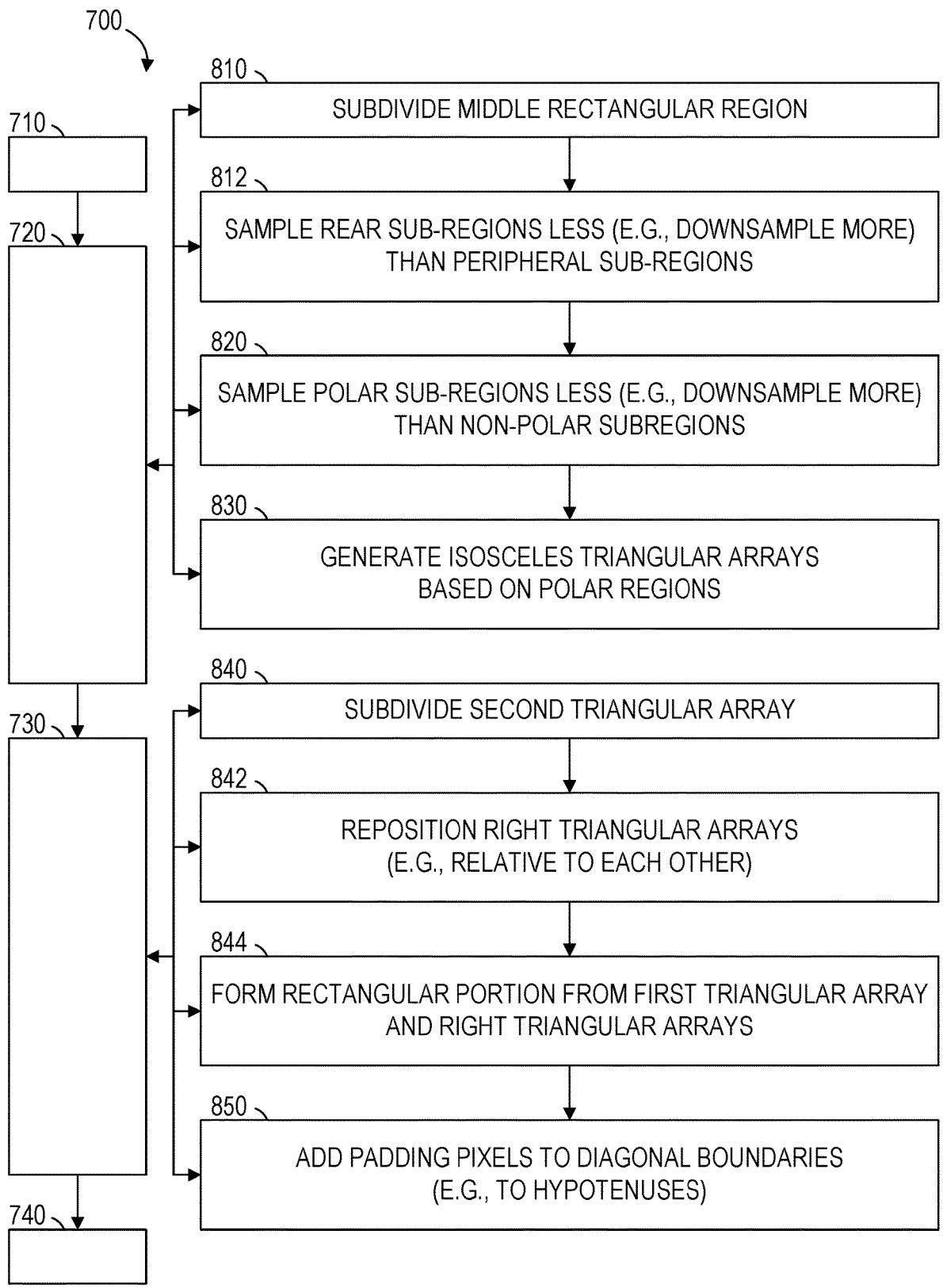

FIGS. 7 and 8 are flowcharts illustrating operations of the image machine 110 or the device 130 in performing a method 700 of generating the output image 650 from the rectangular image 420 that represents the spherical image 410, according to some example embodiments. Operations in the method 700 may be performed by the image machine 110, the device 130, or any suitable combination thereof, using components (e.g., modules) described above with respect to FIG. 2 and FIG. 3, using one or more processors (e.g., microprocessors or other hardware processors), or using any suitable combination thereof. As shown in FIG. 7, the method 700 includes operations 710, 720, 730, and 740.

In operation 710, the image accessor 210 accesses the rectangular image 420 that depicts a projection (e.g., an equirectangular projection) of the spherical image 410. As noted above, the rectangular image 420 may include the upper rectangular region 421 that corresponds to the upper polar region 411 of the spherical image 410. The rectangular image 420 may include the middle rectangular region 422 that corresponds to the equatorial region 412 of the spherical image 410, and the rectangular image 420 may include the lower rectangular region 423 that corresponds to the lower polar region 413 of the spherical image 410.

In operation 720, the image generator 220 generates the triangular array 530 of pixels (e.g., as a first triangular array of pixels) based on the upper rectangular region 421 of the rectangular image 420. The image generator 220 also generates the triangular array 540 of pixels (e.g., as a second triangular array of pixels) based on the lower rectangular region 423 of the rectangular image 420. The image generator 220 further generates a rectangular array of pixels (e.g., including the frontal sub-region 431, the peripheral sub-regions 432, and the rearward sub-regions 433, or including the downsampled frontal sub-region 501, the downsampled peripheral sub-regions 502, and the downsampled rearward sub-regions 503) based on the middle rectangular region 422 of the rectangular image 420.

In operation 730, the image generator 220 generates the output image 650. As noted above, the generated output image 650 includes the triangular array 530 of pixels (e.g., the first triangular array of pixels), the right triangular arrays 610 and 620 of pixels (e.g., as constituent portions that form the second triangular array of pixels), and the rectangular array 630 of pixels.

In operation 740, the image provider 230 provides a representation of rearranged image data of the spherical image 410 by providing the output image 650 that was generated in operation 730. For example, the generated output image 650 may be provided to a server (e.g., in the network-based system 105), to a device (e.g., the device 150), to a database (e.g., the database 115), or to any other recipient machine (e.g., via the network 190). As another example, the output image 650 may be provided internally (e.g., within the device 130 or within the image machine 110), such as to a software component (e.g. within the app 200), a hardware component (e.g., a memory or a graphics processor), or any suitable combination thereof.

As shown in FIG. 8, in addition to any one or more of the operations previously described, the method 700 may include one or more of operations 810, 812, 820, 830, 840, 842, 844, and 850. One or more of operations 810, 812, 820, and 830 may be performed as part (e.g., a precursor task, a subroutine, or a portion) of operation 720, in which the image generator 220 generates the triangular arrays 530 and 540 and the rectangular array of pixels (e.g., including the frontal sub-region 431, the peripheral sub-regions 432, and the rearward sub-regions 433, or including the downsampled frontal sub-region 501, the downsampled peripheral sub-regions 502, and the downsampled rearward sub-regions 503).

In operation 810, as part of generating the rectangular array generated with the triangular arrays 530 and 540, the image generator 220 subdivides the middle rectangular region 422. For example, the middle rectangular region 422 may be subdivided into the frontal sub-region 431, the peripheral sub-regions 432, and the rearward sub-regions 433 (e.g., as shown in FIG. 4).

In operation 812, as part of generating the rectangular array generated with the triangular arrays 530 and 540, the image generator 220 performs sampling of the rearward sub-regions 433 of the rectangular image 420 and sampling of the peripheral sub-regions 432 of the rectangular image 420. However, the sampling of the rearward sub-regions 433 may be performed to a lesser extent than the sampling of the peripheral sub-regions 432. That is, the rearward sub-regions 433 are sampled less (e.g., downsampled more) than the peripheral sub-regions 432. Thus, the resulting (e.g., downsampled) versions of the rearward sub-regions 433 have been reduced in pixel size and in data size to a greater extent than the resulting versions of the peripheral sub-regions 432. In some example embodiments, the frontal sub-region 431 is not downsampled at all, while in other example embodiments, the frontal sub-region 431 is downsampled (e.g., to an even lesser extent than the peripheral sub-regions 432).

In operation 820, as part of generating the triangular arrays 530 and 540, the image generator 220 performs sampling of the upper rectangular region 421 of the rectangular image 420 and sampling of the lower rectangular region 423 of the rectangular image 420. The sampling of the upper rectangular region 421 may be performed by sampling the polar sub-region 511 and the non-polar sub-region 512, and the sampling of the lower rectangular region 423 may be performed by sampling the polar sub-region 521 and the non-polar sub-region 522. However, the sampling of the polar sub-regions 511 and 521 may be performed to a lesser extent than the sampling of the non-polar sub-regions 512 and 522. That is, the polar sub-regions 511 and 521 are sampled less (e.g., downsampled more) than the non-polar sub-regions 512 and 522. Thus, the triangular array 530 of pixels may result from such differentiated sampling of the upper rectangular region 421, with the polar sub-region 511 being sampled less than the non-polar sub-region 512. Similarly, the triangular array 540 of pixels may result from such differentiated sampling of the lower rectangular region 423, with the polar sub-region 521 being sampled less than the non-polar sub-region 522.

In operation 830, as part of generating the triangular arrays 530 and 540, the image generator 220 generates isosceles triangular arrays of pixels. Specifically, the triangular array 530 is generated with an isosceles triangular shape based on the upper rectangular region 421 or a sampled (e.g., downsampled) version thereof (e.g., based on the polar sub-region 511 and the non-polar sub-region 512, which may be downsampled to different extents). Similarly, the triangular array 540 is generated with an isosceles triangular shape based on the lower rectangular region 423 or a sampled (e.g., downsampled) version thereof (e.g., based on the polar sub-region 521 and the non-polar sub-region 522, which may be downsampled to different extents).

One or more of operations 840, 842, 844, and 850 may be performed as part (e.g., a precursor task, a subroutine, or a portion) of operation 730, in which the image generator 220 generates the output image 650.

In operation 840, as part of generating the output image 650, the image generator 220 subdivides one of the triangular arrays 530 or 540 of pixels into multiple (e.g., two) right triangular arrays of pixels (e.g., right triangular arrays 610 and 620). For example, the triangular array 530 may be divided to obtain two right triangular arrays therefrom. As another example, the triangular array 540 may be divided to obtain the two right triangular arrays 610 and 620 therefrom. In some example embodiments, more than two right triangular arrays (e.g., eight right triangular arrays) are obtained by subdividing the one triangular array 530 or 540.

In operation 842, as part of generating the output image 650, the image generator 220 repositions the right triangular arrays obtained in operation 840. For example, where the two right triangular arrays 610 and 620 were obtained by performance of operation 840, these two right triangular arrays 610 and 620 are repositioned by the image generator 220 in operation 842. As shown in FIG. 6 and noted above, the right triangular arrays 610 and 620 may be repositioned respectively to diagonally opposing corners of the rectangular array formed by the frontal sub-region 501, the peripheral sub-regions 502, and the rearward sub-regions 503. Since the right triangular array 610 starts at the left of the right triangular array 620, and ends on the right side of the right triangular array 620, the right triangular arrays are repositioned relative to each other, in addition to being repositioned relative to the rectangular array of pixels generated in operation 720 (e.g., inclusive of the frontal sub-region 431, the peripheral sub-regions 432, and the rearward sub-regions 433, or inclusive of the downsampled frontal sub-region 501, the downsampled peripheral sub-regions 502, and the downsampled rearward sub-regions 503).

In operation 844, as part of generating the output image 650, the image generator 220 form a rectangular portion of the output image 650 based on (e.g., by combining) the non-subdivided triangular array (e.g., the triangular array 530) and the right triangular arrays repositioned in operation 842 (e.g., the right triangular arrays 610 and 620). For example, where the right triangular arrays 610 and 620 were obtained by performance of operation 840, the image generator 220 may form such a rectangular portion as shown in FIG. 6 and noted above, namely, by combining the triangular array 530 of pixels with the right triangular arrays 610 and 620 of pixels, in the positions illustrated. Where the triangular arrays 530 and 540 have symmetric isosceles triangular shapes, subdividing the triangular array 540 into the right triangular arrays 610 and 620 allows the repositioned right triangular arrays 610 and 620 to join with the triangular array 530 and thus create a rectangle-shaped array of pixels, thus generating a rectangular portion of the output image 650.

In operation 850, as part of generating the output image 650, the image generator 220 causes one or more lines of padding pixels to be included in the output image 650. Various example embodiments of the image generator 220 may perform operation 850 by adding (e.g., inserting) pixels, replacing (e.g., substituting) pixels, or any suitable combination thereof. As shown in FIG. 6 and noted above, the one or more lines of padding pixels may include the horizontal line 640 of padding pixels, the diagonal line 641 of padding pixels, the diagonal line 642 of padding pixels, or any suitable combination thereof.

According to various example embodiments, one or more of the methodologies described herein may facilitate generation of a representation of a spherical image (e.g., the spherical image 410) or image data thereof, which may be pre-processed to obtain a rectangular image (e.g., the rectangular image 420). Moreover, one or more of the systems and methodologies described herein may facilitate generation, storage, and communication of an image (e.g., the output image 650) that facilitates higher performance, lower resource consumption, lower latency, more reliable user experiences, and lower operating costs, compared to capabilities of pre-existing systems and methods.

When these effects are considered in aggregate, one or more of the methodologies described herein may obviate a need for certain efforts or resources that otherwise would be involved in generating a representation of a spherical image. Efforts expended by a user in obtaining data-efficient representations of multiple spherical images (e.g., from a sequence of spherical frames in a spherical video or other immersive visual content depicted in spherical images) may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 9:
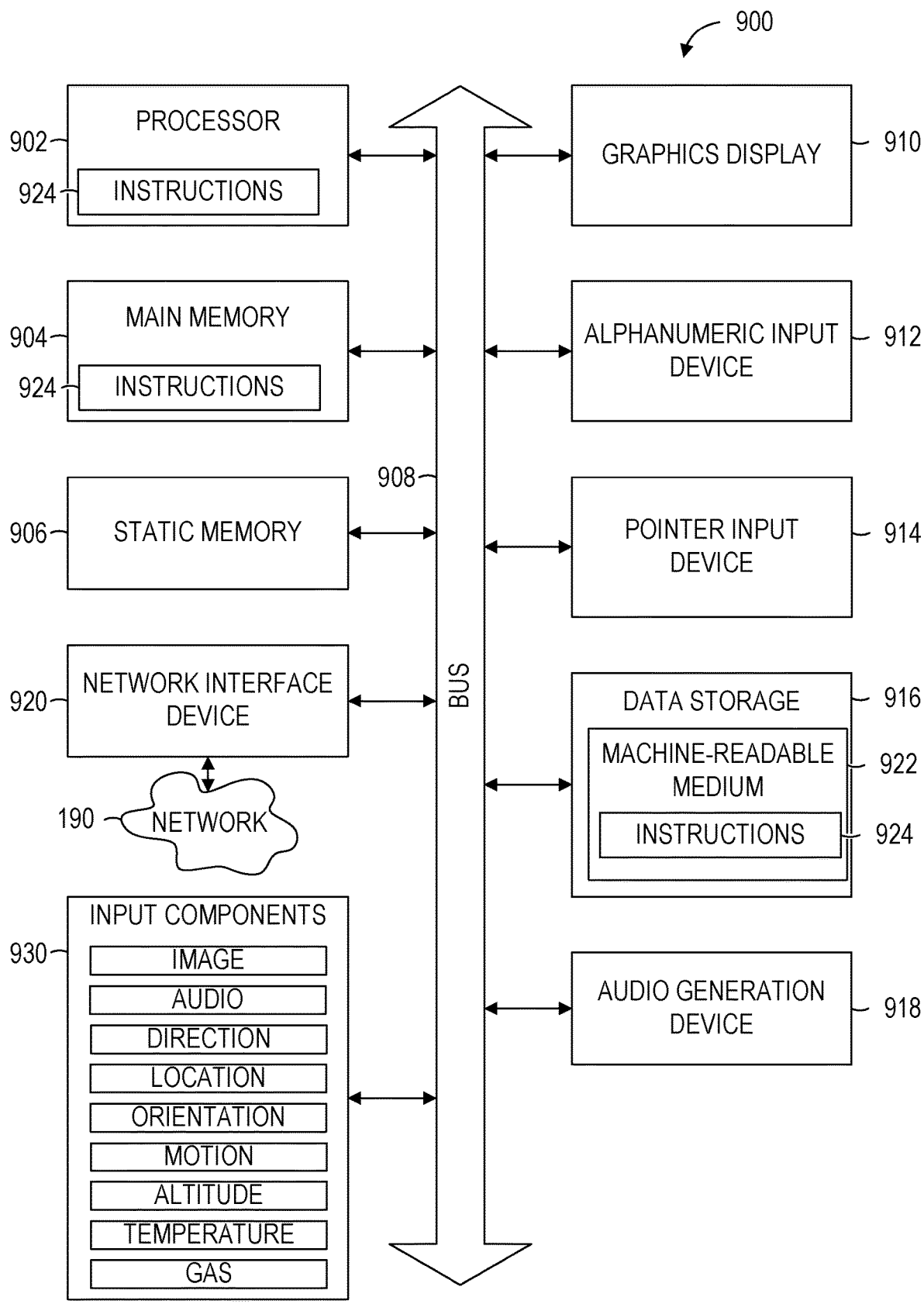
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be communicatively coupled (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 904, and a static memory 906, which are configured to communicate with each other via a bus 908. The processor 902 contains solid-state digital microcircuits (e.g., electronic, optical, or both) that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein. In some example embodiments, the processor 902 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 900 with at least the processor 902, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a pointer input device 914 (e.g., a mouse, a touchpad, a touchscreen, a trackball, a joystick, a stylus, a motion sensor, an eye tracking device, a data glove, or other pointing instrument), a data storage 916, an audio generation device 918 (e.g., a sound card, an amplifier, a speaker, a headphone jack, or any suitable combination thereof), and a network interface device 920.

The data storage 916 (e.g., a data storage device) includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the static memory 906, within the processor 902 (e.g., within the processor's cache memory), or any suitable combination thereof, before or during execution thereof by the machine 900. Accordingly, the main memory 904, the static memory 906, and the processor 902 may be considered machine-readable media (e.g., tangible and non-transitory machine-readable media). The instructions 924 may be transmitted or received over the network 190 via the network interface device 920. For example, the network interface device 920 may communicate the instructions 924 using any one or more transfer protocols (e.g., hypertext transfer protocol (HTTP)).

In some example embodiments, the machine 900 may be a portable computing device (e.g., a smart phone, a tablet computer, or a wearable device) and may have one or more additional input components 930 (e.g., sensors or gauges). Examples of such input components 930 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 930 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 924 for execution by the machine 900 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 924).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:

accessing, by one or more processors of a machine, a rectangular image that depicts a projection of a spherical image, the rectangular image including an upper rectangular region that corresponds to an upper polar region of the spherical image, a middle rectangular region that corresponds to an equatorial region of the spherical image, and a lower rectangular region that corresponds to a lower polar region of the spherical image;

generating, by one or more processors of the machine, a first triangular array of pixels based on the upper rectangular region of the rectangular image, a second triangular array of pixels based on the lower rectangular region of the rectangular image, and a rectangular array of pixels based on the middle rectangular region of the rectangular image;

generating, by one or more processors of the machine, an output image that includes the first triangular array of pixels, the second triangular array of pixels, and the rectangular array of pixels; and providing, by one or more processors of the machine, a representation of rearranged image data of the spherical image by providing the generated output image.

A second example provides a method according to the first example, wherein:

the upper rectangular region of the rectangular image includes a polar sub-region and a non-polar sub-region; and the generating of the first triangular array of pixels includes sampling the polar sub-region of the upper rectangular region less than the non-polar sub-region of the upper rectangular region.

A third example provides a method according to the first example or the second example, wherein:

the lower rectangular region of the rectangular image includes a polar sub-region and a non-polar sub-region; and the generating of the second triangular array of pixels includes sampling the polar sub-region of the lower rectangular region less than the non-polar sub-region of the lower rectangular region.

A fourth example provides a method according to any of the first through third examples, wherein:

the generating of the first triangular array of pixels based on the upper rectangular region generates an isosceles triangular array of pixels that represents image data of the upper polar region of the spherical image.

A fifth example provides a method according to any of the first through fourth examples, wherein:
the generating of the second triangular array of pixels based on the lower rectangular region generates an isosceles triangular array of pixels that represents image data of the lower polar region of the spherical image.

A sixth example provides a method according to any of the first through fifth examples, further comprising:
subdividing the second triangular array into right triangular arrays of pixels; and wherein:
the generating of the output image includes repositioning the right triangular arrays of pixels relative to each other.

A seventh example provides a method according to any of the first through fifth examples, further comprising:
subdividing the second triangular array into right triangular arrays of pixels; and wherein:
the generated output image includes a rectangular portion that includes the first triangular array of pixels and the right triangular arrays of pixels.

An eighth example provides a method according to any of the first to seventh examples, wherein:
the generating of the output image includes adding padding pixels along a diagonal boundary of at least a portion of the first triangular array of pixels.

A ninth example provides a method according to any of the first through eighth examples, wherein:
the generating of the output image includes adding padding pixels along a diagonal hypotenuse of a right triangular array of pixels formed by subdividing the second triangular array of pixels.

A tenth example provides a method according to any of the first through ninth examples, wherein:
the rectangular image depicts an equirectangular projection of the spherical image;
the upper rectangular region of the rectangular image depicts an equirectangular projection of the upper polar region of the spherical image;
the middle rectangular region of the rectangular image depicts an equirectangular projection of the equatorial region of the spherical image; and
the lower rectangular region of the rectangular image depicts an equirectangular projection of the lower polar region of the spherical image.

An eleventh example provides a method according to any of the first through tenth examples, further comprising:
subdividing the middle rectangular region of the rectangular image into a frontal sub-region, multiple peripheral sub-regions, and multiple rearward sub-regions; and wherein:
the generating the rectangular array of pixels includes sampling the rearward and peripheral sub-regions, the rearward sub-regions being sampled less than the peripheral sub-regions; and
the generated rectangular array of pixels in the generated output image includes the sampled peripheral sub-regions and the less sampled rearward sub-regions.

A twelfth example provides a method according to any of the first through eleventh examples, wherein:
the generated output image represents the image data of the spherical image with at least 65% less data than the rectangular image that depicts the projection of the spherical image.

A thirteenth example provides a machine-readable medium (e.g., a non-transitory machine-readable storage medium) comprising instructions that, when executed by one or more processors of a machine, cause the machine to perform operations comprising:
accessing a rectangular image that depicts a projection of a spherical image, the rectangular image including an upper rectangular region that corresponds to an upper polar region of the spherical image, a middle rectangular region that corresponds to an equatorial region of the spherical image, and a lower rectangular region that corresponds to a lower polar region of the spherical image;
generating a first triangular array of pixels based on the upper rectangular region of the rectangular image, a second triangular array of pixels based on the lower rectangular region of the rectangular image, and a rectangular array of pixels based on the middle rectangular region of the rectangular image;
generating an output image that includes the first triangular array of pixels, the second triangular array of pixels, and the rectangular array of pixels; and
providing a representation of rearranged image data of the spherical image by providing the generated output image.

A fourteenth example provides a machine-readable medium according to the thirteenth example, wherein:
the upper rectangular region of the rectangular image includes a polar sub-region and a non-polar sub-region; and
the generating of the first triangular array of pixels includes sampling the polar sub-region of the upper rectangular region less than the non-polar sub-region of the upper rectangular region.

A fifteenth example provides a machine-readable medium according to the thirteenth example or the fourteenth example, wherein:
the generating of the first triangular array of pixels based on the upper rectangular region generates an isosceles triangular array of pixels that represents image data of the upper polar region of the spherical image.

A sixteenth example provides a machine-readable medium according to any of the thirteenth through fifteenth examples, wherein the operations further comprise:
subdividing the second triangular array into right triangular arrays of pixels; and wherein:
the generating of the output image includes repositioning the right triangular arrays of pixels relative to each other.

A seventeenth example provides a system (e.g., a computer system or other system of one or more machines) comprising:
one or more processors; and
a memory storing instructions that, when executed by at least one processor among the one or more processors, cause the system to perform operations comprising:
accessing a rectangular image that depicts a projection of a spherical image, the rectangular image including an upper rectangular region that corresponds to an upper polar region of the spherical image, a middle rectangular region that corresponds to an equatorial region of the spherical image, and a lower rectangular region that corresponds to a lower polar region of the spherical image;
generating a first triangular array of pixels based on the upper rectangular region of the rectangular image, a second triangular array of pixels based on the lower rectangular region of the rectangular image, and a rectangular array of pixels based on the middle rectangular region of the rectangular image;

generating an output image that includes the first triangular array of pixels, the second triangular array of pixels, and the rectangular array of pixels; and providing a representation of rearranged image data of the spherical image by providing the generated output image.

An eighteenth example provides a system according to the seventeenth example, wherein:

the lower rectangular region of the rectangular image includes a polar sub-region and a non-polar sub-region; and the generating of the second triangular array of pixels includes sampling the polar sub-region of the lower rectangular region less than the non-polar sub-region of the lower rectangular region.

A nineteenth example provides a system according to the seventeenth example or the eighteenth example, wherein:

the generating of the second triangular array of pixels based on the lower rectangular region generates an isosceles triangular array of pixels that represents image data of the lower polar region of the spherical image.

A twentieth example provides a system according to any of the seventeenth through nineteenth examples, wherein the operations further comprise:

subdividing the second triangular array into right triangular arrays of pixels; and wherein:

the generated output image includes a rectangular portion that includes the first triangular array of pixels and the right triangular arrays of pixels.

A twenty-first example provides a carrier medium carrying machine-readable instructions for controlling a machine to carry out the operations (e.g., method operations) performed in any one of the previously described examples.

What is claimed is:

1. A method comprising:

accessing, by one or more processors of a machine, a rectangular image that depicts a projection of a spherical image, the rectangular image including an upper rectangular region that corresponds to only an upper polar region of the spherical image, a middle rectangular region that corresponds to only an equatorial region of the spherical image, and a lower rectangular region that corresponds to only a lower polar region of the spherical image;

generating, by one or more processors of the machine, a first triangular array of pixels based on the upper rectangular region that corresponds to only the upper polar region of the spherical image, a second triangular array of pixels based on the lower rectangular region that corresponds to only the lower polar region of the spherical image, and a rectangular array of pixels based on the middle rectangular region that corresponds to only the equatorial region of the spherical image;

generating, by one or more processors of the machine, an output image that includes the first triangular array of pixels, the second triangular array of pixels, and the rectangular array of pixels; and providing, by one or more processors of the machine, a representation of rearranged image data of the spherical image by providing the generated output image.

2. The method of claim 1, wherein:

the upper rectangular region of the rectangular image includes a polar sub-region and a non-polar sub-region; and the generating of the first triangular array of pixels includes sampling the polar sub-region of the upper rectangular region less than the non-polar sub-region of the upper rectangular region.

3. The method of claim 1, wherein:

the lower rectangular region of the rectangular image includes a polar sub-region and a non-polar sub-region; and the generating of the second triangular array of pixels includes sampling the polar sub-region of the lower rectangular region less than the non-polar sub-region of the lower rectangular region.

4. The method of claim 1, wherein:

the generating of the first triangular array of pixels based on the upper rectangular region generates an isosceles triangular array of pixels that represents image data of the upper polar region of the spherical image.

5. The method of claim 1, wherein:

the generating of the second triangular array of pixels based on the lower rectangular region generates an isosceles triangular array of pixels that represents image data of the lower polar region of the spherical image.

6. The method of claim 1, further comprising:

subdividing the second triangular array into right triangular arrays of pixels, and wherein:

the generating of the output image includes repositioning the right triangular arrays of pixels relative to each other.

7. The method of claim 1, further comprising:

subdividing the second triangular array into right triangular arrays of pixels, and wherein:

the generated output image includes a rectangular portion that includes the first triangular array of pixels and the right triangular arrays of pixels.

8. The method of claim 1, wherein:

the generating of the output image includes adding padding pixels along a diagonal boundary of at least a portion of the first triangular array of pixels.

9. The method of claim 1, wherein:

the generating of the output image includes adding padding pixels along a diagonal hypotenuse of a right triangular array of pixels formed by subdividing the second triangular array of pixels.

10. The method of claim 1, wherein:

the rectangular image depicts an equirectangular projection of the spherical image;

the upper rectangular region of the rectangular image depicts an equirectangular projection of the upper polar region of the spherical image;

the middle rectangular region of the rectangular image depicts an equirectangular projection of the equatorial region of the spherical image; and the lower rectangular region of the rectangular image depicts an equirectangular projection of the lower polar region of the spherical image.

11. The method of claim 1, further comprising:

subdividing the middle rectangular region of the rectangular image into a frontal sub-region, multiple peripheral sub-regions, and multiple rearward sub-regions; and wherein:

the generating of the rectangular array of pixels includes sampling the rearward and peripheral sub-regions, the rearward sub-regions being sampled less than the peripheral sub-regions; and the generated rectangular array of pixels in the generated output image includes the sampled peripheral sub-regions and the less sampled rearward sub-regions.

12. The method of claim 1, wherein:
the generated output image represents the image data of the spherical image with at least 65% less data than the rectangular image that depicts the projection of the spherical image.

13. A non-transitory machine-readable medium comprising instructions that, when executed by one or more processors of a machine, cause the machine to perform operations comprising:
accessing a rectangular image that depicts a projection of a spherical image, the rectangular image including an upper rectangular region that corresponds to only an upper polar region of the spherical image, a middle rectangular region that corresponds to only an equatorial region of the spherical image, and a lower rectangular region that corresponds to only a lower polar region of the spherical image;
generating a first triangular array of pixels based on the upper rectangular region that corresponds to only the upper polar region of the spherical image, a second triangular array of pixels based on the lower rectangular region that corresponds to only the lower polar region of the spherical image, and a rectangular array of pixels based on the middle rectangular region that corresponds to only the equatorial region of the spherical image;
generating an output image that includes the first triangular array of pixels, the second triangular array of pixels, and the rectangular array of pixels; and
providing a representation of rearranged image data of the spherical image by providing the generated output image.

14. The non-transitory machine-readable medium of claim 13, wherein:
the upper rectangular region of the rectangular image includes a polar sub-region and a non-polar sub-region; and
the generating of the first triangular array of pixels includes sampling the polar sub-region of the upper rectangular region less than the non-polar sub-region of the upper rectangular region.

15. The non-transitory machine-readable medium of claim 13, wherein:
the generating of the first triangular array of pixels based on the upper rectangular region generates an isosceles triangular array of pixels that represents image data of the upper polar region of the spherical image.

16. The non-transitory machine-readable medium of claim 13, wherein the operations further comprise:
subdividing the second triangular array into right triangular arrays of pixels; and wherein:
the generating of the output image includes repositioning the right triangular arrays of pixels relative to each other.

17. A system comprising:
one or more processors; and
a memory storing instructions that, when executed by at least one processor among the one or more processors, cause the system to perform operations comprising:
accessing a rectangular image that depicts a projection of a spherical image, the rectangular image including an upper rectangular region that corresponds to only an upper polar region of the spherical image, a middle rectangular region that corresponds to only an equatorial region of the spherical image, and a lower rectangular region that corresponds to only a lower polar region of the spherical image;
generating a first triangular array of pixels based on the upper rectangular region that corresponds to only the upper polar region of the spherical image, a second triangular array of pixels based on the lower rectangular region that corresponds to only the lower polar region of the spherical image, and a rectangular array of pixels based on the middle rectangular region that corresponds to only the equatorial region of the spherical image;
generating an output image that includes the first triangular array of pixels, the second triangular array of pixels, and the rectangular array of pixels; and
providing a representation of rearranged image data of the spherical image by providing the generated output image.

18. The system of claim 17, wherein:
the lower rectangular region of the rectangular image includes a polar sub-region and a non-polar sub-region; and
the generating of the second triangular array of pixels includes sampling the polar sub-region of the lower rectangular region less than the non-polar sub-region of the lower rectangular region.

19. The system of claim 17, wherein:
the generating of the second triangular array of pixels based on the lower rectangular region generates an isosceles triangular array of pixels that represents image data of the lower polar region of the spherical image.

20. The system of claim 17, wherein the operations further comprise:
subdividing the second triangular array into right triangular arrays of pixels; and wherein:
the generated output image includes a rectangular portion that includes the first triangular array of pixels and the right triangular arrays of pixels.

* * * * *

UNITED STATES PATENT AND TRADEMARK OFFICE
CERTIFICATE OF CORRECTION

| | | |
|---|---|---|
| PATENT NO. | : 12,211,168 B2 | Page 1 of 1 |
| APPLICATION NO. | : 17/912132 | |
| DATED | : January 28, 2025 | |
| INVENTOR(S) | : Ha et al. | |

It is certified that error appears in the above-identified patent and that said Letters Patent is hereby corrected as shown below:

In the Specification

In Column 7, Line 28, delete "4333" and insert --433-- therefor

In the Claims

In Column 22, Line 25, in Claim 6, delete "pixels," and insert --pixels;-- therefor In Column 22, Line 31, in Claim 7, delete "pixels," and insert --pixels;-- therefor Signed and Sealed this
Twenty-fifth Day of March, 2025

Coke Morgan Stewart
*Acting Director of the United States Patent and Trademark Office*